Dec. 15, 1964 R. H. DETTRE 3,161,534
PROCESS FOR INCREASING THE SCRATCH RESISTANCE OF GLASS
Filed Dec. 22, 1961
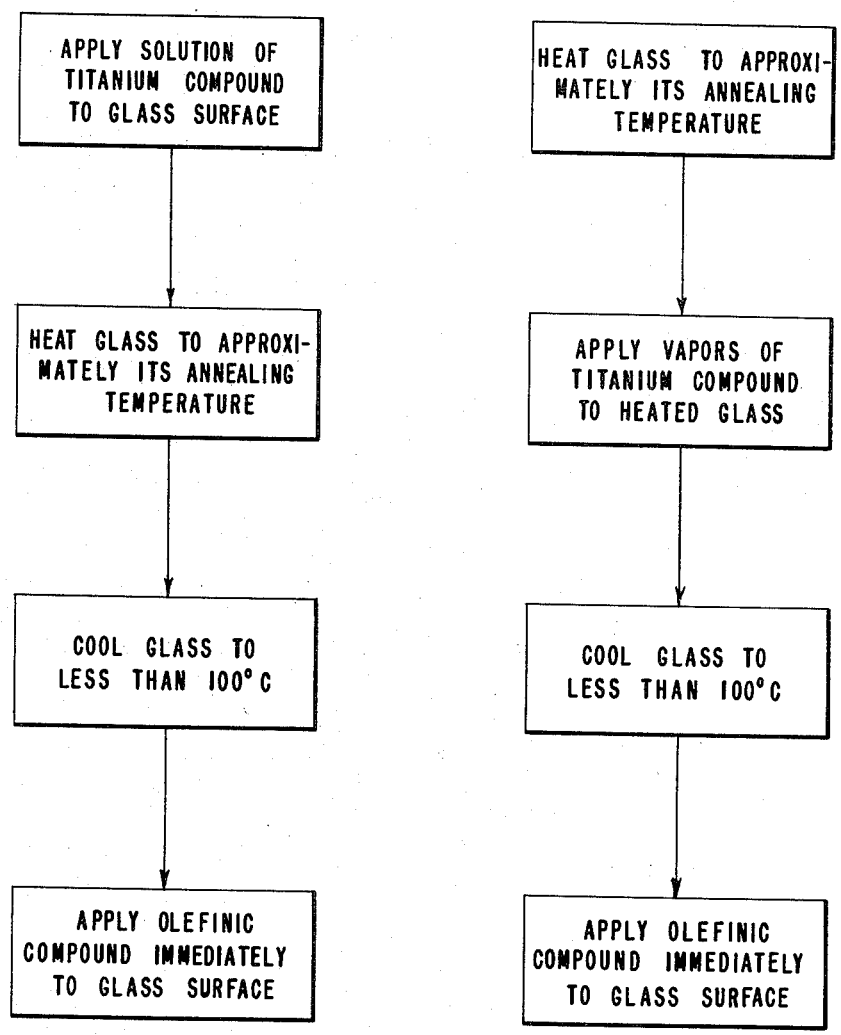
INVENTOR
ROBERT HAROLD DETTRE
BY *Francis J. Crowley*
ATTORNEY United States Patent Office 3,161,534
Patented Dec. 15, 1964

3,161,534
PROCESS FOR INCREASING THE SCRATCH
RESISTANCE OF GLASS
Robert Harold Dettre, Brandywine Hundred, Del.,
assignor to E. I. du Pont de Nemours and Company, Wilmington, Del., a corporation of Delaware
Filed Dec. 22, 1961, Ser. No. 161,414
6 Claims. (Cl. 117—69)

This invention relates to an improved process for increasing the scratch resistance of glass bodies.

The problem and importance of scratch resistance in glass are discussed in detail by Deyrup in U.S.P. 2,831,780. It is a practical industrial problem and relates to such items as the weakening of glass bottles by rubbing against each other in transit, the marring of window glass through scratches by impinging dust or glass fragments, and the weakening of textile glass fibers by mutual abrasion.

In said patent, Deyrup offers a method for overcoming this deficiency of glass by treating the same with the vapors of a metallo-organic compound at a temperature between the lowest annealing temperature of glass and the temperature at which excessive deformation occurs.

In copending application Serial No. 58,616 (now U.S. Patent 3,051,593) and U.S. Patent No. 3,004,863 of C. L. Gray and R. H. Dettre, processes are described and claimed wherein glass articles are treated with an aqueous solution of certain water-soluble and water-stable ester derivatives of titanium, following which the glass articles are passed through an annealing oven wherein they are heated to a temperature at or near the annealing point, and then allowed to cool to essentially room temperature. Still a third type of titanium compounds is employed in a copending application of Brockett, Dettre and Gray, Serial No. 97,757, filed March 23, 1961, now Patent No. 3,130,071.

All these processes have the one feature in common that a titanium oxide film is eventually formed in contact with the glass surface which is probably bonded, partially or completely, with the material of the glass through Ti—O—Si links.

As a final step, however, in all the aforegoing processes the articles must be allowed to stand in open air for a period not less than 20 or 30 minutes. Until after this standing period in air, the scratch resistance effect does not seem to develop fully. And although Deyrup has not recognized or taught it in his patent, a standing period in air is essential in his process, too, if a complete and reliable and reliable development of the scratch resistant effect is desired.

As has been pointed out in U.S. Patent 3,051,593, the standing in open air for 20 minutes before use is apt to occur automatically with almost any glass article. Nevertheless, the standing step takes on a positive aspect, often with uneconomical side features, when one considers belt line production of articles such as milk bottles. The standing step demands that the belt line be held still for 20 minutes or more so as not to give the bottles a chance to scratch each other in motion before their scratch-resistant coating has become fixed. Where the article produced must be of relatively small cost, such holding up period becomes a matter of material economic significance.

Furthermore, the required length of the standing period may vary from one treatment to another (depending on the type of titanium compound selected for the treatment and perhaps also on the temperature and mode of application of the annealing treatment) and therefore often presents problems in control of the process, inasmuch as one cannot readily determine by mere inspection of the articles whether they have or have not received the proper length of air-curing.

It is accordingly an object of this invention to modify the aforementioned processes of imparting scratch resistance of glass bodies, whereby to eliminate the need of holding the treated bodies still in air for a determined period of time after annealing, and to substitute therefor a positive chemical treatment. Other objects and achievements of this invention will become apparent as the description proceeds.

Now, according to my present invention, the curing period is replaced by a treatment with certain chemical agents as defined below, which treatment can be achieved quickly by immersion, spraying or otherwise coating the annealed glass article with an aqueous solution, an organic solvent solution, a melt or even vapors or said chemical agent, depending on the type of agent used as discussed hereinafter.

Reference is made to the attached drawing which illustrates by a flow sheet diagram the process of the present invention.

FIGS. 1 and 2 are alternative processes which differ only with respect to the manner of applying the titanium organic compound. In FIG. 1, a solution of the titanium compound is applied to the glass prior to heating; whereas, in the alternative process of FIG. 2, vapors of a titanium compound are applied to the heated glass. The last two steps in the processes of both FIGS. 1 and 2 are the same.

I have found that glass articles which have been treated with organic titanium compounds and annealed according to said Deyrup patent, said Gray and Dettre patents, or said copending application become satisfactorily scratch resistant if the annealing is followed up with a step of treating said article with a solution, melt or vapors of a monoolefinic compound possessing an aliphatic chain of 8 or more C-atoms directly attached to one of the olefinic carbon atoms or with a solution, melt or vapors of a terminal diolefine containing altogether at least 6 C-atoms. As practical illustrations of such compounds may be mentioned:

Monoolefinic hydrocarbons, such as 1-dodecene, 1-tetradecene, 1-hexadecene, 1-octadecene and 1-eicosene;

Diolefinic hydrocarbons, such as compounds of the formula $CH_2=CH(CH_2)_nCH=CH_2$, wherein $n$ may vary from 2 to 18;

Unsaturated carboxylic acids containing at least ten carbon atoms such as oleic, palmitoleic, linoleic, 10-undecenoic and erucic; and Alkali-metal or ammonium salts of unsaturated carboxylic acids (i.e., soaps), for instance, sodium oleate, sodium 4-tetradecenoate, sodium 10-undecenoate, sodium palmitoleate and sodium linoleate.

The application of these unsaturated organic compounds to glass in accordance with this invention may be achieved by three distinct methods depending on the type of compound being applied.

All three start with a titania coated glass article obtained by the method of said Deyrup patent, said Gray and Dettre patent or said copending application. The coated glass surface is then either (1) dipped into an aqueous solution or organic solvent solution of certain of the above types of compounds, (2) dipped into the liquid melt of certain of these compounds or (3) exposed to the vapors of certain of these compounds. Of course, mixtures of compounds may also be used.

In using solutions, it is, of course, necessary that the compound be soluble in the chosen solvent. Only the alkali-metal or ammonium salts of the unsaturated acids are soluble in water to a sufficient extent to be useful in aqueous solutions. The hydrocarbon olefines, diolefines and the free carboxylic acids are not sufficiently soluble in water to be useful. These latter compounds are all soluble in common organic solvents such as hydrocarbons, alcohols, acetone and the like so that they can be used in organic solvent solutions to good effect. The alkali-metal and ammonium salts, on the other hand, are not generally soluble in organic solvents although some may be sufficiently soluble in specific solvents to be useful, e.g., sodium oleate is soluble to the extent of about 5% in alcohol and such a solution can be used.

The application via the melt is applicable to all of the types of compounds above except the salts. The salts generally have melting points which are too high to be of practical interest. The other types of compounds are, for the most part, either liquids or low melting solids. Application is usually carried out slightly above the melting point of those that are normally solids.

The vapor application method is also not applicable to the salts although it is applicable to the other types. When using the vapor method, it is not necessary that the agent be at reflux temperature; inasmuch as there is sufficient material present in the vapor form over a melt to complete the process. The vapor method is, however, somewhat slower than the other two and the latter are therefore preferred.

Typical commercial operations, including application of the titania coating, are illustrated in the following examples.

*Example I.—Solution Procedure*

Following the procedure of U.S. Patent 3,051,593 to Gray and Dettre, glass bottles are dipped into a 10% aqueous solution of triethanolamine titanate (prepared according to Bostwick, U.S.P. 2,824,114) and the excess solution is allowed to drain from the surface. Alternatively, the solution may be applied to the glass surface as a fine spray. The wetted bottles are then slowly heated to 650° C. in an annealing lehr and then cooled slowly to near ambient temperature. On issuing from the lehr, the bottles are dipped into (or sprayed with) a 0.25% aqueous solution of sodium oleate and allowed to drain.

The bottles thus obtained are immediately scratch resistant as may be demonstrated by rubbing two such bottles together with no apparent effect. (If two bottles are rubbed together immediately after leaving the lehr but before treatment with the solution, they scratch each other readily.)

The sodium oleate solution used above may be replaced with any of the following solutions with equally successful results.

| Compound | Solvent | Concentration |
| --- | --- | --- |
| Sodium oleate | Alcohol | 0.25% |
| Oleic acid | Cetane | 0.25% |
| 1,5-hexadiene | Cetane | 0.25% |
| 1-octadecene | Cetane | 0.25% |

Glass objects treated with nonaqueous solutions are rinsed with water. This merely removes any excess material which may be present and is not essential to the process.

*Example II.—Melt and Vapor Procedure*

Using the procedure of Example I for forming the titanate coating on the glass surface, the glass articles are removed from the lehr on reaching the melt temperature of one of the compounds indicated below and dipped into a melt of said compound. They are then allowed to drain and cool, if necessary, and are rinsed with water. The glass surfaces are immediately scratch resistant.

| Compound: | Temperature of melt, ° C. |
| --- | --- |
| Oleic acid | 25 |
| 10-undecenoic acid | 25 |
| 1-decene | 25 |
| 1-octadiene | 25 |
| 1,5-hexadiene | 25 |
| 1,20-henecosadiene | 60 |
| 1,20-henecosadiene | 95 |

Equally successful results are obtained by passing the glass objects slowly over a reservoir of any of the above listed compounds at a temperature of about 100° to 120° C.

In the above examples, the treatment prior to annealing was done with triethanolamine titanate, in accordance with U.S. Patent 3,051,593 to Gray and Dettre. Equally successful results are obtained if this treatment is done with an aqueous solution of diisopropyl diacetoacetonyl titanate (as in the Gray and Dettre Patent No. 3,004,638), or with an aqueous solution of a water-soluble titanium lactate complex (as in copending application of Brockett, Dettre and Gray, Serial No. 97,757), or with vapors of tetraisopropyl titanate (as in Deyrup, U.S.P. 2,831,780), or again if the bottles are dipped in or sprayed with heptane solutions of dihydroxy-bis(2-ethyl-1,3-hexanediol) titanate, poly(dibutyl titanate) or tetrakis(2-ethyl-1,3-hexanediol) titanate and then heated to the annealing temperature as taught in the above mentioned references. None of these methods produce glass surfaces which are scratch resistant immediately on leaving the annealing lehr but they become so on treatment according to this invention.

As an added advantage of the treatment constituting this invention, it has been found that glass articles produced by the present process are more scratch resistant than those produced by the methods of the aforementioned patents and copending application, even though the air-curing step above described has been applied to the titanium-treated glass.

The resistance to scratching of a glass surface can be measured by drawing a glass rod across the surface and measuring the weight or tension which must be applied to the rod to produce a scratch. In this manner, the higher scratch resistance produced by the present process can be readily demonstrated.

Treatment with the special agents of this invention of a glass object which does not have a preformed titania coating with the compounds defined in the aforementioned patents or in said copending application, imparts to said glass objects a hydrophobic surface but not scratch resistance to any degree.

The scratch resistant glass surfaces produced according to the present invention are durable to washing with water, but not to washing with aqueous solutions of anionic detergents, such as the alkali metal salts of long chain alkyl sulfates or alkyl or alkaryl sulfonates. However, where an article has been washed with such a detergent, the scratch-resistant surface thereon can be reformed by treating the article again, in one of the aforegoing manners, with one of the agents mentioned in this specification. (In other words, the curing treatment is repeated on the washed article, but there is no need for repeating the treatment with a titanium ester or the annealing operation.)

It will be understood that the details of procedure above set forth may be varied widely within the skill of those engaged in this art.

For instance, the temperature to which the glass is allowed to cool in the annealing lehr need not drop below the temperature at which the curing treatment is intended to be applied, and may indeed be considerably higher so long as there is no danger of shattering the glass object by abrupt cooling during the curing treatment. Altogether, the various modes of application of the curing treatment of this invention may vary in temperature from room temperature to 150° C., while the temperature of the glass just prior to the curing treatment may be some 50° C. higher than the temperature of the applied solution, melt or vapor.

I claim as my invention:

1. In a process for increasing the scratch resistance of glass by applying an organo-titanium compound to the surface of the glass, which is in non fibrous form, heating the glass, and then allowing the glass to stand in air for a period of not less than 20 minutes to develop the desired scratch resistance, the improvement which comprises eliminating the standing period required to develop scratch resistance by coating the surface of the glass, immediately after the heating step and at a temperature between room temperature and 150° C., with an olefinic compound selected from the group consisting of monoolefinic hydrocarbons containing 8–20 C-atoms; diolefinic hydrocarbons of the formula $$CH_2=CH(CH_2)_nCH=CH_2$$

wherein $n$ may vary from 2–18; and unsaturated hydrocarbon carboxylic acids containing 10–22 C-atoms; and the alkali metal and ammonium salts of said acids.

2. The process of claim 1 wherein the olefinic compound is an alkali metal salt of unsaturated hydrocarbon carboxylic acid containing 10–22 C-atoms and is applied to the glass from an aqueous solution of said compound.

3. The process of claim 1 wherein the olefinic compound is an ammonium salt and is applied to the glass from an aqueous solution of said compound.

4. The process of claim 1 wherein the olefinic compound is applied to the glass from a solution of said compound in an organic solvent.

5. The process of claim 1 wherein the olefinic compound is applied to the glass in molten form.

6. The process of claim 1 wherein the olefinic compound is sodium oleate.

References Cited in the file of this patent

UNITED STATES PATENTS

| | | |
|---|---|---|
| 2,107,284 | Bone et al. | Feb. 8, 1938 |
| 2,132,138 | Williams et al. | Oct. 4, 1938 |
| 2,184,320 | Simpson | Dec. 26, 1939 |
| 2,224,149 | Fisher | Dec. 10, 1940 |
| 2,229,975 | Kaplan | Jan. 28, 1941 |
| 2,234,986 | Slayter et al. | Mar. 18, 1941 |
| 2,272,588 | Simison | Feb. 10, 1942 |
| 2,371,933 | Steinbock | Mar. 20, 1945 |
| 2,584,763 | Waggoner | Feb. 5, 1952 |
| 2,671,033 | Waggoner | Mar. 2, 1954 |
| 2,693,429 | Radtke | Nov. 2, 1954 |
| 2,920,981 | Whitehurst | Jan. 12, 1960 |
| 2,932,598 | Henning | Apr. 12, 1960 |
| 2,938,812 | Marzocchi et al. | May 21, 1960 |
| 3,004,863 | Gray et al. | Oct. 17, 1961 |
| 3,033,719 | Marzocchi et al. | May 8, 1962 |
| 3,041,202 | Whitehurst | June 26, 1962 |
| 3,051,593 | Gray et al. | Aug. 28, 1962 |
| 3,062,745 | Gaynor et al. | Nov. 6, 1962 |